United States Patent
Li et al.

(10) Patent No.: US 9,395,257 B2
(45) Date of Patent: Jul. 19, 2016

(54) ELECTRONIC TORQUE TOOL WITH INTEGRATED REAL-TIME CLOCK

(71) Applicant: Snap-on Incorporated, Kenosha, WI (US)

(72) Inventors: Jie Li, Rancho Santa Margarita, CA (US); Jerry A. King, Hacienda Hts, CA (US); Chris Lawton, Costa Mesa, CA (US); Nathan J. Lee, Escondido, CA (US); Andrew R. Lobo, Wadsworth, IL (US)

(73) Assignee: Snap-on Incorporated, Kenosha, WI (US)

( * ) Notice: Subject to any disclaimer, the term of this patent is extended or adjusted under 35 U.S.C. 154(b) by 577 days.

(21) Appl. No.: 13/891,605

(22) Filed: May 10, 2013

(65) Prior Publication Data

US 2014/0336955 A1    Nov. 13, 2014

(51) Int. Cl.
*G01L 5/24* (2006.01)
*G06F 11/30* (2006.01)

(52) U.S. Cl.
CPC .............. *G01L 5/24* (2013.01); *G06F 11/3065* (2013.01)

(58) Field of Classification Search
CPC ............................. G06F 11/3065; G01L 5/24
USPC ................... 702/41; 81/467, 479; 73/862.21, 73/862.23, 862.324, 862.338, 862.333
See application file for complete search history.

(56) References Cited

U.S. PATENT DOCUMENTS

| | | | | | |
|---|---|---|---|---|---|
| 4,125,016 | A | * | 11/1978 | Lehoczky | B25B 23/1425 73/862.23 |
| 4,669,319 | A | * | 6/1987 | Heyraud | B25B 23/1425 73/862.23 |
| 5,303,601 | A | * | 4/1994 | Schonberger | B25B 23/1425 73/862.21 |
| 6,608,568 | B1 | * | 8/2003 | Ruchti | B64D 43/02 244/17.11 |
| 6,981,436 | B2 | * | 1/2006 | Becker | B25B 23/1425 29/428 |
| 7,082,866 | B2 | * | 8/2006 | Becker | B25B 23/1425 702/151 |
| 7,089,834 | B2 | * | 8/2006 | Reynertson | B25B 23/1425 73/862.23 |
| 7,249,526 | B2 | * | 7/2007 | Hsieh | B25B 23/14 73/862.21 |

(Continued)

FOREIGN PATENT DOCUMENTS

| | | |
|---|---|---|
| CN | 101041234 A | 9/2007 |
| CN | 202162747 U | 3/2012 |

(Continued)

OTHER PUBLICATIONS

Canadian Intellectual Property Office Examiner's Report, dated Aug. 10, 2015; 4 pages.

(Continued)

*Primary Examiner* — Carol S Tsai
(74) *Attorney, Agent, or Firm* — Seyfarth Shaw LLP

(57) ABSTRACT

Real-time clock circuitry integrated in an electronic torque tool facilitates time-stamping of torque data acquired by the electronic torque tool. The time stamped torque data may be displayed on a display integrated in the electronic torque tool or may be communicated to an external device. The real-time clock circuitry may be adjusted based on information received from an external device or may be manually input to a keypad of the electronic torque tool. A calibration timer integrated in the electronic torque tool monitors time between calibrations of the tool and notifies a user upon expiration of a calibration interval. A secondary power source is coupled to the real-time clock circuitry to maintain power to the real-time clock circuitry during battery replacement.

18 Claims, 5 Drawing Sheets

(56) References Cited

U.S. PATENT DOCUMENTS

| | | | |
|---|---|---|---|
| 7,591,195 B2 * | 9/2009 | Puzio | B25B 23/1456 73/862.324 |
| 7,621,190 B2 * | 11/2009 | Ahmad | G01R 31/2817 73/862.474 |
| 7,878,076 B2 | 2/2011 | Lucke et al. | |
| 8,413,525 B1 * | 4/2013 | Schultz | B25B 23/14 73/862.21 |
| 9,156,148 B2 * | 10/2015 | King | B25B 23/1425 |
| 2002/0082665 A1 * | 6/2002 | Haller | A61N 1/37264 607/60 |
| 2005/0223856 A1 * | 10/2005 | Reynertson | B25B 23/1425 81/467 |
| 2007/0036035 A1 * | 2/2007 | Cho | H04H 40/27 368/12 |
| 2012/0191378 A1 | 7/2012 | Chu et al. | |
| 2013/0199307 A1 * | 8/2013 | Provost | G01L 5/24 73/862.27 |

FOREIGN PATENT DOCUMENTS

| | | |
|---|---|---|
| CN | 202472300 U * | 10/2012 |
| EP | 2159007 A1 | 3/2010 |
| JP | 2006-320984 | 11/2006 |
| JP | 2006320984 A | 11/2006 |
| JP | 2007111798 A | 5/2007 |
| WO | WO 2010/066375 | 6/2010 |

OTHER PUBLICATIONS

Australian Government; Patent Examination Report No. 1, dated Jul. 10, 2014; 5 pgs.
Combined Search and Examination Report for GB1407722.6, dated Aug. 28, 2014.
Taiwan Search Report dated Jan. 1, 2016; 1 page.
State Intellectual Property Office of P.R. China, First Office Action, dated Dec. 7, 2015, with English translation; 11 pages.

* cited by examiner

| DATE/TIME | TARGET TORQUE | PEAK TORQUE | TARGET ANGLE | PEAK ANGLE | TORQUE UNITS | TORQUE STATUS | ANGLE STATUS | MODE COUNT |
|---|---|---|---|---|---|---|---|---|
| 5/7/2013 11:42:58 | 250 | 251.4 | 0 | 0 | FT-LB | OK | OK | 1 |
| 5/7/2013 11:56:18 | 45 | 45.2 | 0 | 0 | FT-LB | OK | OK | 1 |
| 5/7/2013 12:03:24 | 0 | 136.1 | 90 | 91 | FT-LB | OK | OK | 1 |

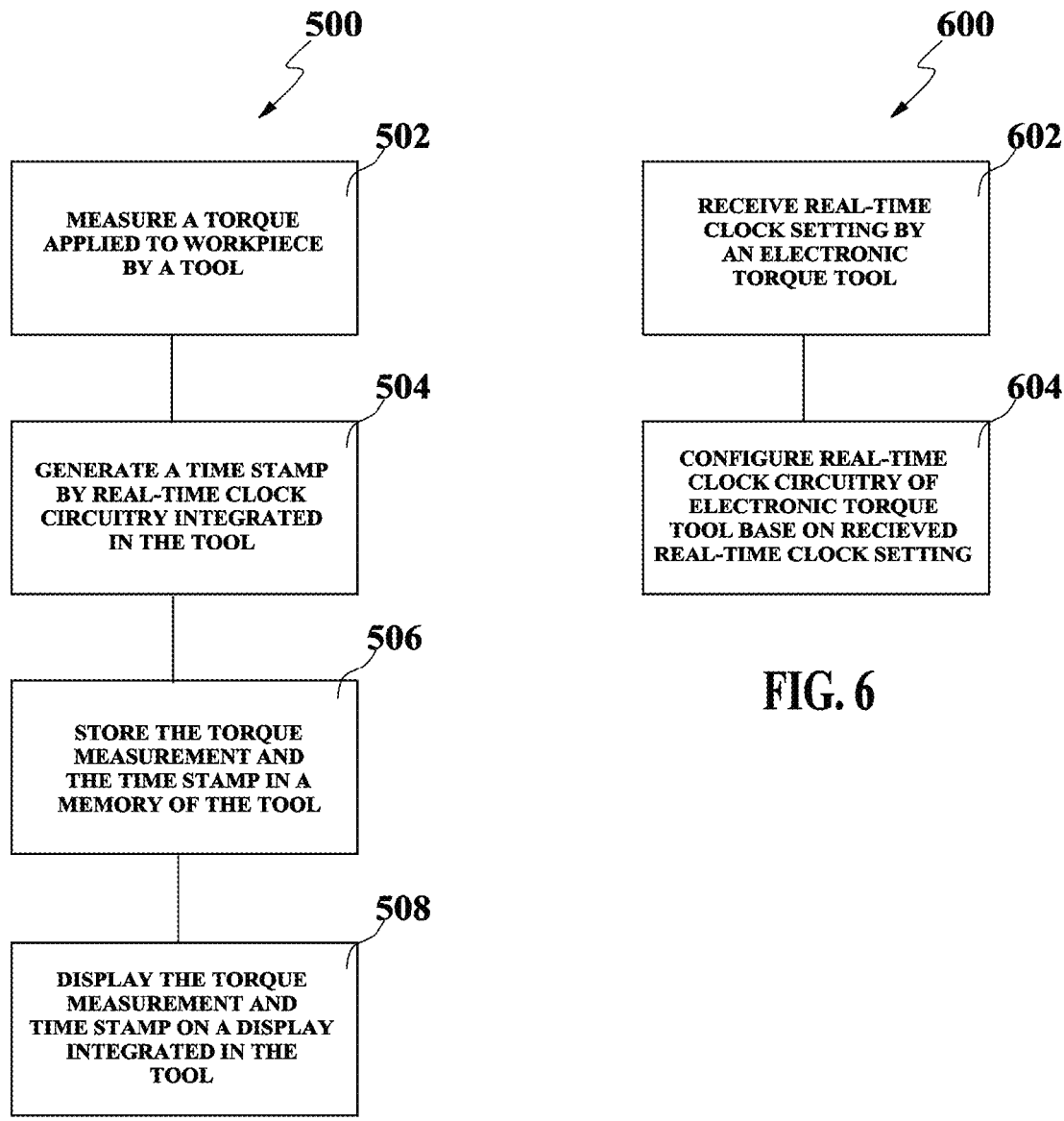

ELECTRONIC TORQUE TOOL WITH INTEGRATED REAL-TIME CLOCK

TECHNICAL FIELD OF THE INVENTION

The present application relates to a tool for applying torque to a work piece. More particularly, the present application relates to an electronic torque wrench configured for generating time stamped torque measurements.

BACKGROUND OF THE INVENTION

Precision tools, such as torque wrenches, are commonly used in automotive and industrial applications to apply a predetermined amount of torque and/or angular displacement to a work piece such as a threaded fastener, for example. A particular torque and/or angular displacement may be specified in a job specification or work schedule to be applied to each work piece in a job. The precision tools are commonly adjustable and may be manually configured to apply the specified torque and/or angular displacement to each work piece in the job. Once a specified torque or angle setting is configured, the precision tool may prevent a user from exceeding a specified torque or angular displacement by actuating a mechanical release between the force applicator or handle of the tool and the work piece or head of the tool, for example. Alternately, the precision tool may provide an indication when the specified torque and/or angular displacement has been applied by providing a tactile, audible or visual indication, for example.

Precision tools, such as torque wrenches, are also commonly used to measure the applied torque and/or angular displacement applied to a work piece. In many applications, the measurements of torque and/or angular displacement that are acquired by the use of such precision tools are manually recorded in a log for quality assurance purposes. The recorded log of torque data generally does not include accurate or precise measurement times associated with specific torque measurements and therefore is poorly suited for many quality control and process monitoring purposes.

SUMMARY OF THE INVENTION

According to an aspect of the present application, an electronic torque tool is configured with real-time clock circuitry. The electronic tool may include a communication interface such as a wireless communication interface, or a universal serial bus (USB) interface, for example, configured for communication with an external device such as a personal computer (PC). Client software may be executed on the external device to input a real-time clock setting to the electronic torque tool or to receive time stamped torque data from the electronic torque tool via the communication interface.

An apparatus according to an aspect of the present application includes a torque tool adapted to apply torque to work pieces. The torque tool includes a processor, a memory coupled to the processor, torque sensor circuitry coupled to the processor and real-time clock circuitry coupled to the processor. First power circuitry and second power circuitry are coupled to the real-time clock circuitry. The second power circuitry coupled to the real-time clock circuitry is configured to maintain power to the real-time clock circuitry when the first power circuitry is de-energized. The torque tool also includes a keypad coupled to the processor and a display coupled to the processor. Instructions stored in the memory are executable by the processor to receive time data from the real-time clock circuitry, generate a time stamp corresponding to a torque measurement output of the torque sensing circuitry based on the time data and store the time stamp and the torque measurement in the memory. Instructions stored in the memory are executable further to display a time set menu on the display and set a time in the clock circuitry based on a user input to the keypad. According to this aspect of the application, an external device may be coupled to the torque tool. The external device may include a user interface configured for facilitating the downloading the time stamp and the torque measurement.

A method according to another aspect of the present disclosure includes measuring a torque applied to a work piece by a tool adapted to apply torque to the work piece to generate a torque measurement. A time stamp representing a time of the torque measurement is generated by real-time clock circuitry integrated in the tool. The torque measurement and the time stamp are stored in a memory integrated in the tool.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

FIG. 5 is a process flow diagram illustrating a method for generating and displaying time stamped torque information on an electronic torque tool according to an embodiment of the present application.

FIG. 6 is a process flow diagram illustrating a method for communicating real-time clock settings to an electronic torque tool from an external device according to an embodiment of the present application.

Figure 1:
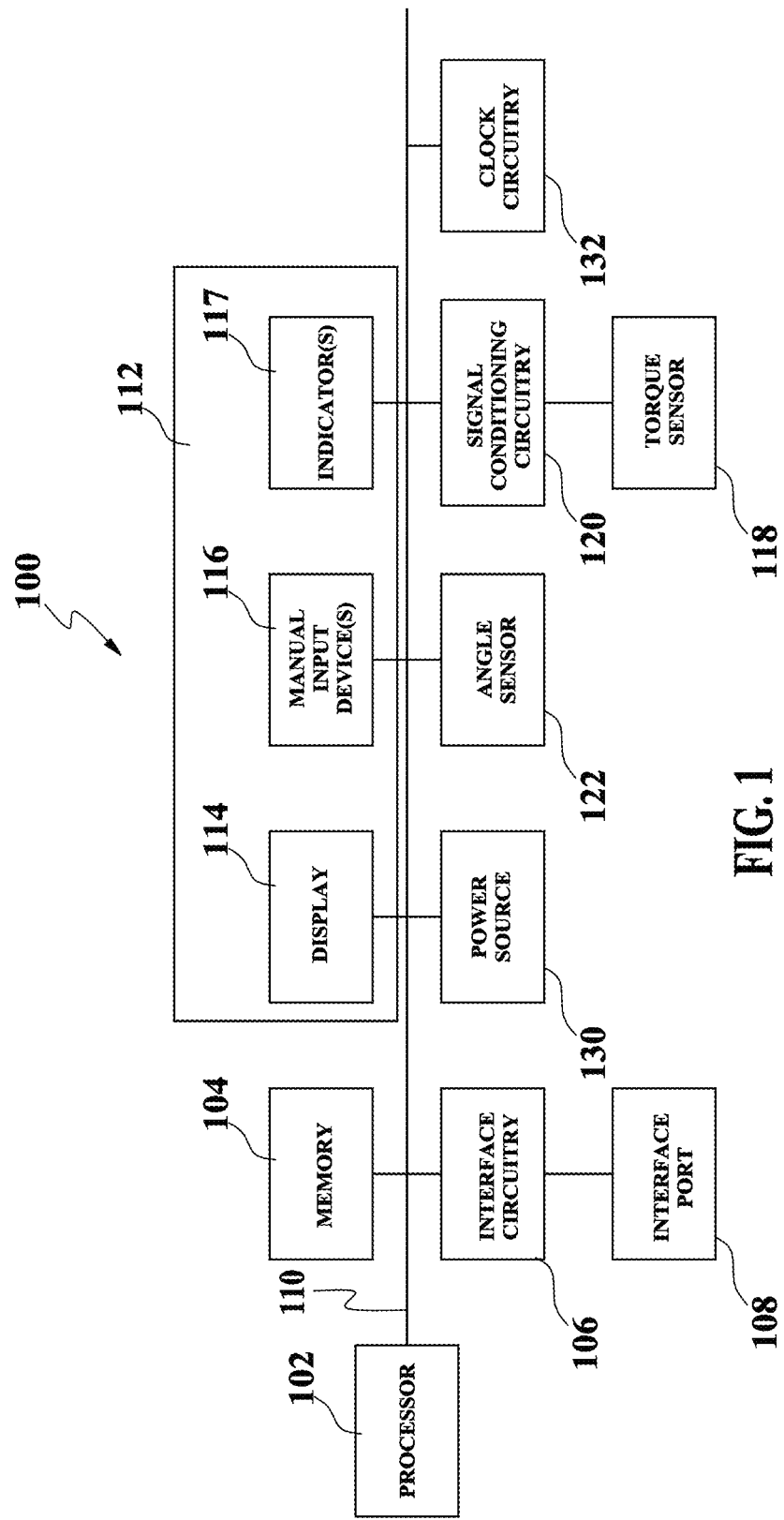
FIG. 1 is a block diagram illustrating a torque tool in accordance with an embodiment of the present application.

It should be understood that the comments included in the notes as well as the materials, dimensions and tolerances discussed therein are simply proposals such that one skilled in the art would be able to modify the proposals within the scope of the present application.

DETAILED DESCRIPTION OF THE EMBODIMENTS

While this invention is susceptible of embodiments in many different forms, there is shown in the drawings, and will herein be described in detail, a preferred embodiment of the invention with the understanding that the present disclosure is to be considered as an exemplification of the principles of the invention and is not intended to limit the broad aspect of the invention to embodiments illustrated.

The present application involves incorporating real-time clock circuitry into a tool adapted to apply torque to work pieces, such as threaded fasteners, bolts, and nuts, such as, for example, an electronic torque wrench, to provide a log of time stamped torque data. To meet the demands of automotive and industrial applications or quality control, electronic torque wrenches may be used to log a schedule of torques and/or angles of rotation applied by a torque tool to one or more work pieces. According to aspects of the present application, a method and system is provided to allow data collected by an electronic torque wrench to be automatically time stamped and to archive measured torque and angle data with the date and time of the corresponding measurements.

Precision measurement tools such as electronic torque tools are commonly scheduled for periodic recalibration. According to aspects of the present application, the real-time clock circuitry in an electronic torque tool may be used to provide a method of storing the date of a current calibration. An elapsed time since the last calibration may be calculated by the torque tool based an output of the real-time clock circuitry and on a predetermined calibration interval. The predetermined calibration interval may be input by a user or manufacturer of the electronic torque tool, for example. According to aspects of the application, a user notification may be generated by the electronic torque tool when the calibration interval has expired. In one example, a notification of an expired calibration interval may occur whenever the electronic tool is turned on without preventing further use of the device. The calibration may optionally be disabled by a user. In another example, the expired calibration notification may prevent further use of the electronic torque tool until recalibration is performed.

An embodiment of the present application includes a personal computer (PC) based client software tool for communicating with electronic torque wrenches. The PC based client software tool facilitates initial setup and re-setting of time in the real-time clock circuitry using a wireless communication interface or a communication port interface, such as, for example, universal serial bus (USB), Firewire, serial, parallel, infrared, wireless, or Thunderbolt port.

According to an aspect of the present application, an electronic torque wrench has the capability to generate time stamped torque and angle log information, representing respective amounts of torque or angular displacement applied to work pieces, into an internal memory such as a flash memory configured on the electronic torque wrench. A method for downloading the log into a computer system for records, archives or quality audit purposes is also disclosed. According to an aspect of the application, a secondary power source is provided in the electronic torque tool and coupled to the real-time clock circuitry to prevent resetting of the real-time clock during interruptions of a primary power source, such as during battery replacement.

Referring to FIG. 1, according to an aspect of the present application, a tool adapted to apply torque to work pieces, such as an electronic torque wrench 100, includes a processor 102 and a memory 104 coupled to the processor. The tool 100 also includes interface circuitry 106 operably coupled to a communication interface port 108, such as a universal serial bus (USB), Firewire, serial, parallel, infrared, wireless, or Thunderbolt port, for example. The interface circuitry 106 and memory 104 may be coupled to the processor by one or more internal signal paths 110.

The processor 102 facilitates communication between various components of the tool 100 and controls operation of various electrical components of the tool 100. According to an aspect of the present application, the memory 104 can store data or computer programs for use with the tool 100. For example, the memory 104 may be used to store preset torque and angle target values for use in an automatic setting, or store temporary torque and angle target values, for example. Without limitation, the memory 104 can include a non-transitory computer-readable recording medium, such as a hard drive, DVD, CD, flash drive, volatile or non-volatile memory, RAM, or any other type of data storage, for example.

The tool 100 may also include user interface circuitry 112 coupled to the processor 102. The user interface circuitry 112 may include a display 114 and one or more manual input devices 116, such as a set of buttons, for example. Alternately, the display 114 and input devices 116 may be integrated in a single device, such as a touch screen that performs both display and manual input functions. The user interface circuitry 112 may also include one or more indicators 117 such as, for example, light emitting diodes (LEDs) coupled to the processor 102 to provide feedback to a user.

According to one aspect of the present application, the tool 100 also includes a torque sensor 118, such as strain gauge or load cell, for example, coupled to the processor 102, which is adapted to measure the amount of torque applied by the tool to a work piece. The torque sensor 118 may include signal conditioning circuitry 120, such as analog to digital converter circuitry, configured to convert an analog strain gauge or load cell output signal to a digital signal format suitable for input to or use by the processor 102, for example. An angular displacement sensor 122, which may be incorporated into the torque sensor 118 and which is adapted to measure the amount of angular displacement of the work piece, may also be coupled to the processor 102. The angular displacement sensor 122 may include a micro-electromechanical system (MEMS) gyroscope, for example.

A primary power source 130 and real-time clock circuitry 132 are also coupled to the processor 102. The primary power source 130 may include a source of electrical or power, such as one or more batteries, fuel cells, or solar cells, for example. The real-time clock circuitry 132 may be configured to display the time, provide time stamp for torque and angle measurements, and/or to facilitate timing of various processes involved in preset torque or angle jobs, for example. In order to maintain power to the real-time clock circuitry 132 during interruptions of the primary power source 130, such as during battery replacement, the tool 100 may also include a secondary power source 134 coupled to the processor 102 and/or the real-time clock circuitry 132. The secondary power source 134 may include energy storage components such as one or more batteries, fuel cells, solar cells or capacitors, for example. In an embodiment, the display 114 can display various information for the user to view and interpret, for example, stored or real-time measurements of torque or angular displacement, presets, or other text or graphic information. By way of example, the display 114 can include a liquid crystal display (LCD), organic light emitting diode (OLED) display, plasma screen, cathode ray tube display, or any other kind of black and white or color display that will allow the user to view and interpret information.

The indicators 117 can include structures that visually, audibly, or through tactile means, provide indication to the user when a predetermined amount of torque or angle target is reached. For example, the indicators 117 can include one or more LEDs and LCD backlight that illuminate when a preset torque or angular displacement is reached. Alternately, the indicators 117 can include a vibration mechanism that vibrates when the preset torque or angular displacement is reached.

Figure 2:
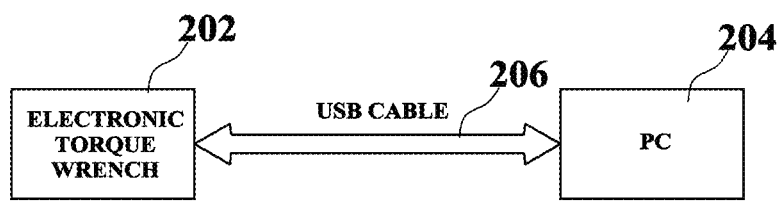
FIG. 2 is a block diagram illustrating a torque tool coupled to an external device according to an embodiment of the present application.

Referring to FIG. 2, according to one aspect of the present application, a tool, such as an electronic torque wrench 202, may be coupled to an external device such as a personal computer 204 using a standard interface connector such as a USB cable 206, for example. Coupling between the tool and an external device my alternatively be implemented using wireless communication techniques such as WiFi, for example. This allows information such as preset job parameters, calibration information, wrench system parameters and wrench system software updates, for example, to be input to the electronic torque wrench 202 from the PC 204. The connection between the electronic torque wrench 202 and the PC 204 also allows torque and/or angular displacement measurements, representing stored torque and/or angular application to work pieces, to be downloaded from the electronic torque wrench 202 to a log on the PC, for example.

Figures 3, 4:
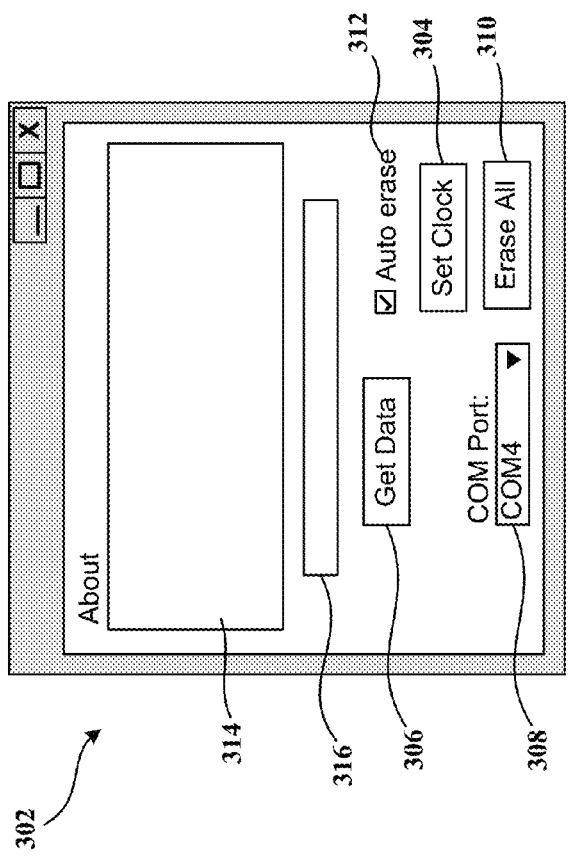
FIG. 3 is an example of a graphical user interface for entering set up information to configure preset jobs on the electronic torque wrench according to an embodiment of the present application.
FIG. 4 is an example of time stamped torque information in accordance with an embodiment of the present application.

Referring to FIGS. 2 and 3, the PC 204 may be configured to execute client software that provides a graphical user interface for entering clock set up information to configure the real-time clock circuitry on the electronic torque wrench 202, and/or to display a status of a data transfers between the electronic torque wrench 202 and the PC 204, for example. The client software may be configured to present one or more display screens 302 to a user for displaying a clock set button 304 and/or an upload data button 306. A user may select the clock set button 304 to reset the real-time clock circuitry of a the electronic torque wrench based on a real-time clock setting in the PC 204, for example. The user may select the upload data button 306 to upload data from the electronic torque wrench 202 to the PC 204. The uploaded data may include one or more torque measurements stored on the torque wrench along with time stamps corresponding to the torque measurements generated by the real-time clock circuitry on the torque wrench 202, for example. It should be understood that the real-time clock circuitry may generate date information as well as time information and that settings and outputs described herein may include time of day information and/or date information. It should also be understood that terms such as "time" and "time stamp" as used herein are inclusive of date information and date stamps, for example.

The display screen 302 may also include an interface port selection field 308 that allows a user to specify which interface of the PC 204 will be used for communicating with the electronic torque wrench 202 and an erase all button 310 that allows a user to manually clear data stored in the memory of the electronic torque wrench 202. An auto-erase field 310 may also be provided in the display screen 302 to optionally trigger automatic erasure of data stored in the memory of the electronic torque wrench after the data has been transferred to the PC 204. The display screen 302 may include a status window 314 and/or a progress bar 316 for displaying the status of a real-time clock setting and/or a torque data transfer according to aspects of the present disclosure.

FIG. 4 shows an example of a data record 400 including time stamped torque information that can be uploaded from an electronic torque wrench to an external device such as a PC according to aspects of the present disclosure. The record may include a plurality of measurement parameters including a time stamp 402, a target torque 404, a peak torque 406, a target angle 408, a peak angle 410, torque units 412, torque status 414 angle status 416 and an operation sequence/mode count 418, for example.

FIG. 5 is a process flow diagram illustrating a process 500 according to an aspect of the present application. The process may be performed on a tool adapted to apply torque to a work piece, such as an electronic torque wrench. Optionally, the electronic torque wrench may be coupled to an external device such as personal computer via wireless connection or a cable, such as universal serial bus (USB), Firewire, serial, parallel, wireless, infrared, or Thunderbolt cable for example. As shown, the process 500 begins and proceeds to step 502, which includes measuring a torque applied to a work piece by the tool. In step 504, the process includes generating a time stamp by real-time clock circuitry integrated in the tool. In step 506, the method includes storing the torque measurement and the time stamp in a memory of the tool. In step 508, the process includes displaying the torque measurement and time stamp on a display integrated in the tool.

FIG. 6 is a process flow diagram illustrating a process 600 according to an aspect of the present application. The process may be performed on a tool adapted to apply torque to a work piece, such as an electronic torque wrench. The tool may include a communication port, such as a USB port, coupled to a personal computer via a communication cable, such as a USB cable, or a wireless communication interface, for example. As shown, the process 600 begins and proceeds to step 602, which includes receiving a real-time clock setting. The real-time clock setting may be received by the tool from an external device or may be input to the tool manually via a keypad integrated in the tool, for example. In an embodiment, the real-time clock can be used to time stamp data stored in the tool, such as, for example, the stored torque measurements or stored angular displacement measurements. In block 604, the method includes configuring a real-time clock integrated in the electronic torque tool based on the received real-time clock setting.

Figure 7:
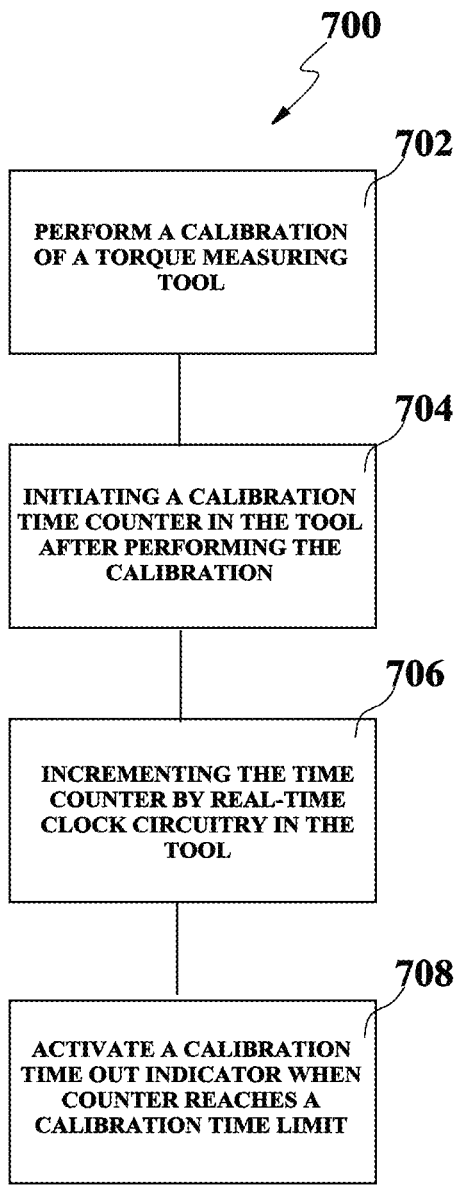
FIG. 7 is a process flow diagram illustrating a method of indicating expiration of a calibration interval on an electronic torque tool according to an embodiment of the present application.

FIG. 7 is a process flow diagram illustrating a process 700 according to an aspect of the present application. The process may be performed on a tool adapted to apply torque to a work piece, such as an electronic torque wrench. The tool may include a wireless communication interface and/or a communication port, such as a USB port, coupled to a personal computer via a communication cable, such as a USB cable, for example. As shown, the process 700 begins and proceeds to step 702, which includes performing a calibration of the tool. In step 704, the process includes initiating a calibration time counter in the tool after performing the calibration. In step 706, the process includes incrementing the counter by real-time clock circuitry integrated in the tool. In step 708, the method includes activating a calibration time-out indicator when the counter reaches a calibration time limit.

Figure 8:
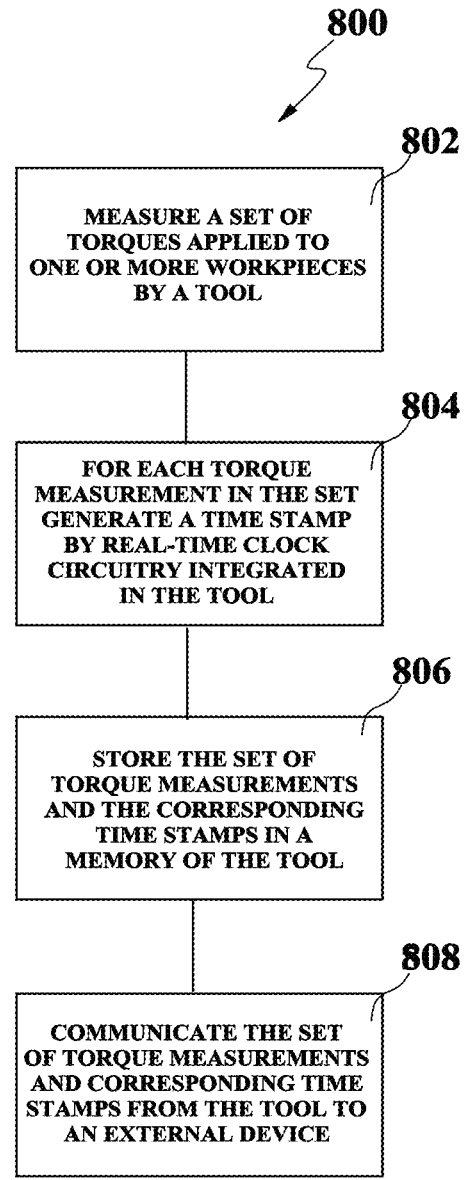
FIG. 8 is a process flow diagram illustrating a method of communicating a set of time stamped torque data from an electronic torque tool to an external device according to an embodiment of the present application.

FIG. 8 is a process flow diagram illustrating a process 500 according to another aspect of the present application. The process may be performed on a tool adapted to apply torque to a work piece, such as an electronic torque wrench coupled to an external device such as personal computer via wireless connection or a cable, such as universal serial bus (USB), Firewire, serial, parallel, wireless, infrared, or Thunderbolt cable for example. As shown, the process 800 begins and proceeds to step 802, which includes measuring a set of torques applied to one or more work pieces by the tool. In step 804, the process includes generating a time stamp by real-time clock circuitry integrated in the tool for each torque measurement in the set of torque measurements. In step 806, the method includes storing the set of torque measurements and the corresponding time stamps in a memory of the tool. In step 808, the process includes communicating the set of torque measurement and corresponding time stamps to an external device.

As discussed above, the tool 100 may be an electronic torque wrench. However, it should be understood that the tool 100 can be any mechanism for applying torque to a work piece without departing from the scope of the present application. For example, and without limitation, the precision tool 100 can be a ratchet wrench, open wrench, monkey wrench, or any other tool capable of applying torque to a work piece.

As used herein, the term "coupled" or "communicably coupled" can mean any physical, electrical, magnetic, or other connection, either direct or indirect, between two parties. The term "coupled" is not limited to a fixed direct coupling between two entities.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

What is claimed is:

1. A torque tool adapted to apply torque to a work piece, comprising:
   a processor;
   a memory operably coupled to the processor;
   a torque sensor operably coupled to the processor;
   a real-time clock operably coupled to the processor;
   a calibration reset switch operably coupled to the processor;
   a calibration timeout indicator operably coupled to the processor, and
   instructions stored in the memory, and executable by the processor to:
      receive time data from the real-time clock;
      initiate a time counter based on a reset signal from the calibration reset switch;
      increment the time counter based on the time data; and
      activate the calibration timeout indicator when the time counter reaches a predetermined time count.

2. The torque tool of claim 1, further comprising:
   first and second power circuitries coupled to the real-time clock, wherein the second power circuitry provides power to the real-time clock when the first power circuitry cannot provide power to the real-time clock.

3. The torque tool of claim 1, further comprising:
   a keypad operably coupled to the processor; and
   a display operably coupled to the processor, wherein the instructions are executable by the processor to further:
      display a time set menu on the display; and
      set a time in the clock circuitry based on a user input to the keypad.

4. The torque tool of claim 1, wherein the instructions are executable by the processor to further:
   generate time-stamped torque measurement data that includes a time from the real-time clock when a torque measurement from the torque sensor is received by the processor.

5. The torque tool of claim 4, further comprising:
   a display operably coupled to the processor, wherein the instructions are executable by the processor to further display the time-stamped torque measurement data on the display.

6. The torque tool of claim 4, wherein the instructions are executable by the processor to further store the time-stamped torque measurement data in the memory.

7. The torque tool of claim 1, further comprising:
   an interface coupled to the processor, wherein the instructions are executable by the processor to further set a time in the real-time clock circuitry based on input from an external device via the interface circuitry.

8. The torque tool of claim 1, further comprising:
   an interface operably coupled to the processor, wherein the instructions are executable by the processor to further communicate the time-stamped torque measurement data to an external device via the interface.

9. The torque tool of claim 8, wherein the interface includes a transceiver configured for wireless communication with the external device.

10. A method of measuring an amount of torque applied to a work piece by a tool, comprising:
    measuring the amount of torque applied to the work piece by the tool to generate a torque measurement;
    generating a time stamp with a real-time clock circuitry operably coupled to the tool representing a time the torque measurement was measured, thereby creating time-stamped torque measurement data that includes the time stamp and torque measurement;
    storing the time-stamped torque measurement data in a memory operably coupled to the tool;
    initiating a time counter after calibration of the tool is performed;
    incrementing the time counter by the real-time clock circuitry; and
    activating a calibration timeout indicator when the time counter reaches a calibration time limit.

11. The method of claim 10, further comprising:
    displaying the time-stamped torque measurement data on a display operably coupled to the tool.

12. The method of claim 10, further comprising:
    displaying a time set menu on a display operably coupled to the tool; and
    setting a time in the real-time clock circuitry based on an input to a keypad operably coupled to the tool.

13. The method of claim 10, further comprising:
    receiving, by the tool, a clock setting from an external device; and
    setting the real-time clock circuitry based on the clock setting.

14. The method of claim 10, further comprising:
    coupling an external device to an interface of the tool; and
    communicating the time-stamped torque measurement data to the external device via the interface.

15. The method of claim 10, further comprising:
    displaying the calibration time limit on a calibration menu on a display operably coupled to the tool; and
    setting the calibration time limit based on an input to a keypad operably coupled to the tool.

16. The method of claim 10, further comprising:
    receiving, by the tool, a calibration time limit setting from an external device; and
    adjusting the calibration time limit based on the calibration time limit setting.

17. The method of claim 10, further comprising:
    storing a time the calibration was performed in the memory; and
    displaying the time the calibration was performed on a display operably coupled to the tool.

18. A torque measuring system, comprising:
    a processor;
    a memory operably coupled to the processor;
    a torque sensor circuitry operably coupled to the processor;
    a real-time clock circuitry operably coupled to the processor;
    first and second power circuitries operably coupled to the real-time clock circuitry, wherein the second power circuitry provides power to the real-time clock circuitry when the first power circuitry cannot provide power to the real-time clock circuitry;
a keypad operably coupled to the processor;
a display operably coupled to the processor;
a calibration reset switch operably coupled to the processor;
a calibration timeout indicator operably coupled to the processor; and
instructions stored in the memory and executable by the processor to:
  receive time data from the real-time clock circuitry;
  generate time-stamped torque measurement data that includes a time from the real-time clock circuitry when a torque measurement from the torque sensor circuitry is received by the processor;
  store the time-stamped torque measurement data in the memory;
  display a time set menu on the display;
  set the real-time clock circuitry based on a user input to the keypad;
  initiate a time counter based on a reset signal from the calibration reset switch;
  increment the time counter based on the time data; and
  activate the calibration timeout indicator when the time counter reaches a predetermined time count; and
an external device operably coupled to the torque tool and including a user interface configured for facilitating the downloading the time-stamped torque measurement data.

* * * * *